(12) United States Patent
Caruel

(10) Patent No.: US 9,777,670 B2
(45) Date of Patent: Oct. 3, 2017

(54) AIRCRAFT PROPULSION UNIT INCLUDING AT LEAST ONE TURBOJET ENGINE AND A NACELLE

(71) Applicant: AIRCELLE, Gonfreville l'Orcher (FR)

(72) Inventor: Pierre Caruel, Le Havre (FR)

(73) Assignee: AIRCELLE, Gonfreville L'Orcher (FR)

( * ) Notice: Subject to any disclaimer, the term of this patent is extended or adjusted under 35 U.S.C. 154(b) by 524 days.

(21) Appl. No.: 14/166,159

(22) Filed: Jan. 28, 2014

(65) Prior Publication Data

US 2014/0137541 A1 May 22, 2014

Related U.S. Application Data

(63) Continuation of application No. PCT/FR2012/051693, filed on Jul. 17, 2012.

(30) Foreign Application Priority Data

Jul. 29, 2011 (FR) .................................... 11/56960

(51) Int. Cl.
| | |
|---|---|
| *F02K 1/62* | (2006.01) |
| *F02K 1/72* | (2006.01) |
| *F02K 3/06* | (2006.01) |

(52) U.S. Cl.
CPC ................ *F02K 1/625* (2013.01); *F02K 1/72* (2013.01); *F02K 3/06* (2013.01)

(58) Field of Classification Search
CPC ... F02K 1/763; F02K 1/12; F02K 1/06; F02K 1/30; F02K 1/172; F02K 3/06; F02K 1/625; F02K 1/766
See application file for complete search history.

(56) References Cited

U.S. PATENT DOCUMENTS

| | | | | | |
|---|---|---|---|---|---|
| 3,779,010 | A | * | 12/1973 | Chamay | .................... F02K 1/09 239/265.31 |
| 2011/0243719 | A1 | * | 10/2011 | Murphy | ................. B64D 29/02 415/182.1 |

FOREIGN PATENT DOCUMENTS

| | | |
|---|---|---|
| FR | 2 934 327 A1 | 1/2010 |
| GB | 1 259 045 A | 1/1972 |
| WO | 96/19656 A1 | 6/1996 |

OTHER PUBLICATIONS

International Search Report issued Oct. 30, 2012 in International Application No. PCT/FR2012/051693.

* cited by examiner

*Primary Examiner* — Moshe Wilensky
(74) *Attorney, Agent, or Firm* — Burris Law, PLLC

(57) ABSTRACT

The present disclosure relates to a nacelle for a dual-flow turbojet engine includes a cold airstream having a non-constant cross-section over the periphery of the nacelle, such that at least one flap is radially offset with respect to the central axis of the turbojet engine, relative to the adjacent flaps. The system for driving the radially offset flaps is suitable for ensuring that the kinematics of the flaps are offset relative to the kinematics of the flaps mounted along the remainder of the periphery of the airstream.

8 Claims, 3 Drawing Sheets

AIRCRAFT PROPULSION UNIT INCLUDING AT LEAST ONE TURBOJET ENGINE AND A NACELLE

CROSS-REFERENCE TO RELATED APPLICATIONS

This application is a continuation of International Application No. PCT/FR2012/051693, filed on Jul. 17, 2012, which claims the benefit of FR 11/56960, filed on Jul. 29, 2011. The disclosures of the above applications are incorporated herein by reference.

FIELD

The present disclosure relates to an aircraft propulsion assembly comprising a turbojet engine nacelle provided with a cascade thrust reverser device.

BACKGROUND

The statements in this section merely provide background information related to the present disclosure and may not constitute prior art.

An aircraft is moved by several turbojet engines each housed in a nacelle also housing a set of connected actuating devices related to its operation and performing various functions when the turbojet engine is operating or stopped. These connected actuating devices in particular comprise a mechanical thrust reverser device.

The propulsion assembly of the aircraft formed by the nacelle and the turbojet engine is designed to be suspended from a stationary structure of the aircraft, for example below a wing or on the fuselage, by means of a suspension pylon.

The nacelle generally has a tubular structure comprising an air intake upstream from the turbojet engine, a middle section designed to surround a fan of the turbojet engine, a downstream section housing the thrust reverser means and designed to surround a combustion chamber and the turbines of the turbojet engine, and generally ends with a jet nozzle whereof the outlet is situated downstream from the turbojet engine.

This nacelle may be designed to house a dual flow turbojet engine, i.e., a turbojet engine capable of generating a hot air flow (also called primary flow) coming from the combustion chamber of the turbojet engine and by means of the rotating fan blades, and a cold air flow (secondary flow) that circulates outside the turbojet engine through a flow tunnel of the cold air flow.

An outer structure called OFS (Outer Fan Structure), housing the thrust reverser means, and an inner structure IFS (Inner Fan Structure), designed to cover a downstream section of the turbojet engine, both belonging to the downstream section of the nacelle, define the flow tunnel of the cold air flow as well as a passage section of the cold air flow.

The thrust reverser device is able, during landing of the aircraft, to improve the braking capacity thereof by reorienting at least part of the thrust generated by the turbojet engine forward. During that phase, it obstructs the flow tunnel for the cold air flow and orients the latter toward the front of the nacelle, thereby generating a counterthrust that is added to the braking of the wheels of the aircraft.

In the case of a so-called cascade reverser, the cold air flow is reoriented by cascade vanes associated with a cowl having a sliding function serving to expose or cover said vanes.

Additional blocking doors, also called flaps, activated by the sliding of the cowl, allow closing of the flow tunnel of the cold air flow, downstream from the vanes so as to allow the reorientation of the cold air flow toward the cascade vanes.

These flaps are mounted pivotably on the cowl sliding between a retracted position, in which they provide, with said moving cowl, the aerodynamic continuity of an inner wall of the outer structure of the nacelle, and a deployed position in which, in the thrust reversal situation, they at least partially close off the tunnel so as to deflect the flow of cold air toward the cascade vanes exposed by the sliding of the cowl.

Traditionally, the pivoting of each flap is guided by connecting rods attached on the one hand to the flap, and on the other hand to a stationary point of the inner structure of the nacelle delimiting the flow tunnel for the flow of cold air.

The installation of such a cascade thrust reverser device on a turbojet engine below the wing is made complex when the maximum nacelle height constraint is critical due to a low ground clearance of the aircraft and a proximity between the turbojet engine and the wing of the aircraft.

Such an installation furthermore involves delicate management of the passage section for the cold air flow.

In the context of this issue, it has already been proposed to place, in an aircraft with low ground clearance, a cascade thrust reverser device by reducing the length of the cascade vanes and increasing the axial air leaks naturally present between the reverser flaps (so as to avoid interference), when they are deployed in the reverse jet of the device, and axial air leaks between each flap and the inner structure of the nacelle delimiting the flow tunnel for the flow of cold air.

The leaks between each flap and the inner structure of the nacelle delimiting the tunnel are even greater when the length of the cascade vanes is reduced so as to preserve substantially the same flow rate of the cold air flow.

This makes it possible to reduce the thickness of the moving cowl and, consequently, the nacelle, which may retain a substantially circular section.

However, the assembling choice for such a device involves a reduced and low reverser efficiency, since the leak flow rate affects the reverser efficiency.

In the context of this issue, it has also been proposed to reduce the height of the nacelle by proposing a nacelle that is not of revolution around the central axis of the turbojet engine, called "flattened nacelle".

Such a priori flat nacelle has no impact on the reversal efficiency. It is possible to retain the same leakage level as on a reverser in a normal configuration.

In that case, the thrust reverser flaps are of different heights to adapt to the different tunnel height at 12 o'clock (i.e., in the upper part of the nacelle) and at 6 o'clock (i.e., in the lower part of the nacelle), and the connecting rods actuating the thrust reverser flaps have different lengths to ensure that the flaps all pivot with the same angle.

The combination of leakage flaps and flattened nacelle, with no offset kinematics, is therefore feasible with connecting rods of different lengths.

SUMMARY

The present disclosure provides a nacelle for an aircraft with low ground clearance that has reduced dimensions while penalizing the reversal efficiency as little as possible.

To that end, the present disclosure proposes an aircraft propulsion assembly comprising at least a turbojet engine and a nacelle, said turbojet engine nacelle comprising:

an outer structure provided with a thrust reverser device, and an inner structure designed to cover a downstream section of the turbojet engine, the outer structure and the inner structure defining a flow tunnel for a flow of air from the turbojet engine, the thrust reverser device comprising:

means for deflecting at least part of the flow of air from the turbojet engine, and at least one moving cowl translatable in a direction parallel to the longitudinal axis of the nacelle, the cowl being able to alternate between a closed position, in which it ensures the aerodynamic continuity of the nacelle, and an open position, in which it opens a passage in the nacelle intended for the deflected air flow, flaps mounted pivoting between a retracted position, in which they ensure the aerodynamic continuity of the nacelle, and a deployed position in which, in the thrust reversal situation, they partially close off the tunnel so as to deflect the flow of air toward the deflection means exposed by the sliding of the cowl, each flap being associated with a drive system.

The nacelle is remarkable in that:

the tunnel has a transverse section that is not constant over the periphery of the nacelle, such that at least one flap is radially offset with respect to the central axis of the turbojet engine, relative to the adjacent flaps, and the system for driving the radially offset flaps is suitable for offset kinematics of said flaps relative to the kinematics of the flaps mounted on the rest of the periphery of the tunnel, in particular to provide a different closing angle of said flaps.

According to other features of the aircraft propulsion assembly according to the present disclosure, considered alone or in combination:

the tunnel has a zone with a reduced transverse section on either side of upper and/or lower beams connected to a suspension pylon of the propulsion assembly;

the radius of an inner shroud of the cowl, on either side of the upper and/or lower beams, is smaller than the radius of said shroud along the horizontal axis, perpendicular to the central axis of the turbojet engine;

the drive system is suitable for implementing offset pivoting of the flaps mounted on the zone with a reduced transverse section of the tunnel relative to the flaps mounted on the rest of the periphery of the tunnel;

the drive system is suitable for deploying the flaps mounted on the zone of the tunnel with a reduced transverse section upstream or downstream from the other flaps mounted on the rest of the periphery of the tunnel;

the drive system is suitable for limiting an offset deployment of the flaps mounted on the zone of the tunnel with a reduced transverse cross-section relative to the flaps mounted on the rest of the periphery of the tunnel;

the drive system comprises at least one driving connecting rod for each of the flaps, said connecting rods having an identical length and the anchoring points of the connecting rods situated on the flaps mounted on the zone of the tunnel with a reduced transverse cross-section are offset along the central axis and placed downstream from the anchoring points of the connecting rod situated on flaps mounted on the rest of the periphery of the tunnel;

the drive system comprises at least one driving connecting rod for each of the flaps, said connecting rods having an identical length and the anchoring points of the connecting rods, situated on the inner structure of the nacelle, of the flaps mounted on the zone of the tunnel with a reduced transverse cross-section being offset relative to those of the flaps mounted on the rest of the periphery of the tunnel.

The present disclosure further proposes a nacelle as described above.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

In all of these figures, identical or similar numbers designate identical or similar members or sets of members.

Figure 1:
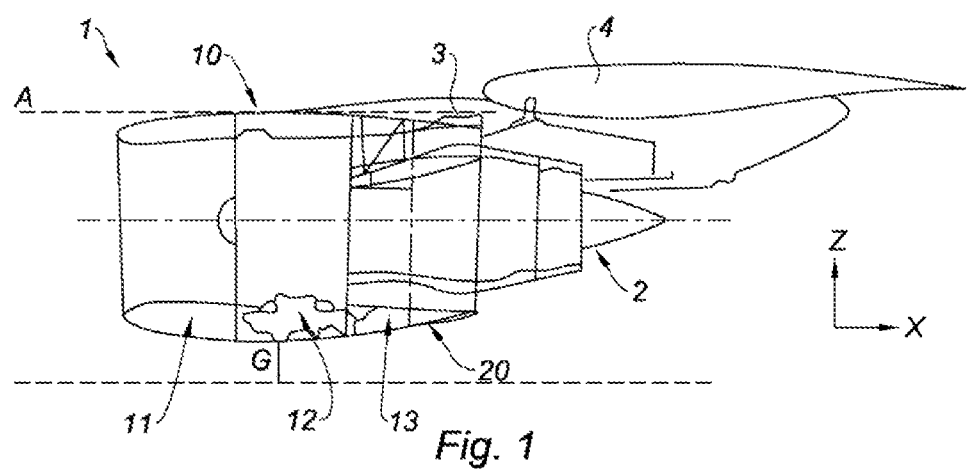
FIG. 1 is a longitudinal cross-sectional view of an aircraft propulsion assembly.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It will be noted that a reference has been defined in the description with three axes X, Y, Z, the three axes representing:

the longitudinal direction of the turbojet engine for the axis x, the direction leading the longitudinal axis of the turbojet engine to the longitudinal axis of the pylon for the direction Z, and the direction orthogonal to X and Z for the axis Y.

In the case of a propulsion assembly mounted below the wing of an aircraft, the axis Z is generally vertical.

In the description below, the vertical axis will be likened to the axis Z, even if the aircraft propulsion assembly is mounted in another configuration, for example such as in a rear fuselage, for simplification purposes.

It will also be noted that the terms "upstream" and "downstream" are to be understood relative to the direction of the flow of air in the turbojet engine during normal direct jet operation.

FIG. 1 shows a propulsion assembly 1 of an aircraft.

In general, this aircraft propulsion assembly 1 is in particular formed by a nacelle 10 and a turbojet engine 2.

A pylon 3 makes it possible to suspend the propulsion assembly 1 from a stationary structure 4 of the aircraft, for example below a wing or on the fuselage.

As illustrated in this figure, the aircraft has a small ground clearance defined between the ground and the lowest part of the nacelle 10, designated by G in the figure.

Additionally, it will be observed that the propulsion assembly 1 is close to the wing, as indicated by the dotted line, designated A in the figure.

The nacelle 10 is designed to form a tubular housing for the dual flow turbojet engine 2 and serves to channel the flows of air that it generates by means of the blades of a fan (not shown), i.e., a hot air flow passing through a combustion chamber of the turbojet engine 2, and a cold air flow circulating outside the turbojet engine 2.

The nacelle 10 has, generally speaking, a structure comprising a front section 11 forming an air intake, a middle section 12 surrounding the fan of the turbojet engine 2, and a downstream section 13 surrounding the turbojet engine 2 and comprising a thrust reverser device 20.

Figure 2:
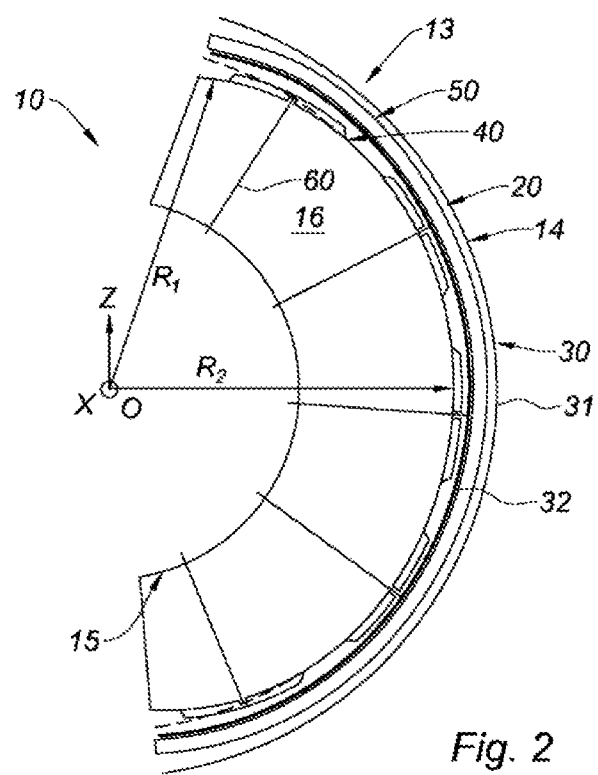
FIG. 2 is a transverse cross-sectional view of a discharge section of the nacelle according to one form of the present disclosure.
Figure 3:
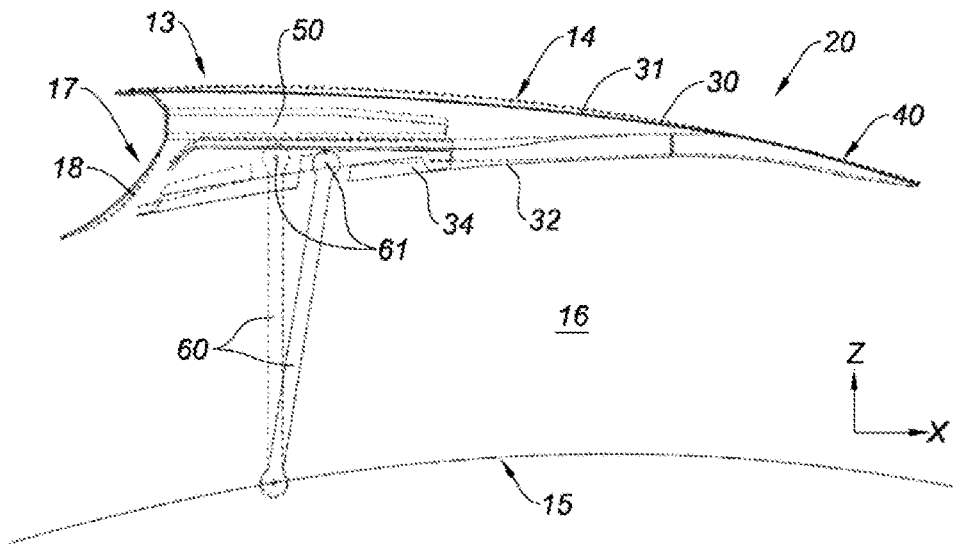
FIGS. 3 and 4 are longitudinal cross-sectional views of a thrust reverser device of the nacelle of FIG. 2, in the direct jet position and the reverse jet position, respectively, the cross-sectional views of said device at a reduced tunnel section of the nacelle (solid lines) and at a nominal tunnel section of the nacelle (in dotted lines) having been superimposed in each of the figures.
Figure 4:
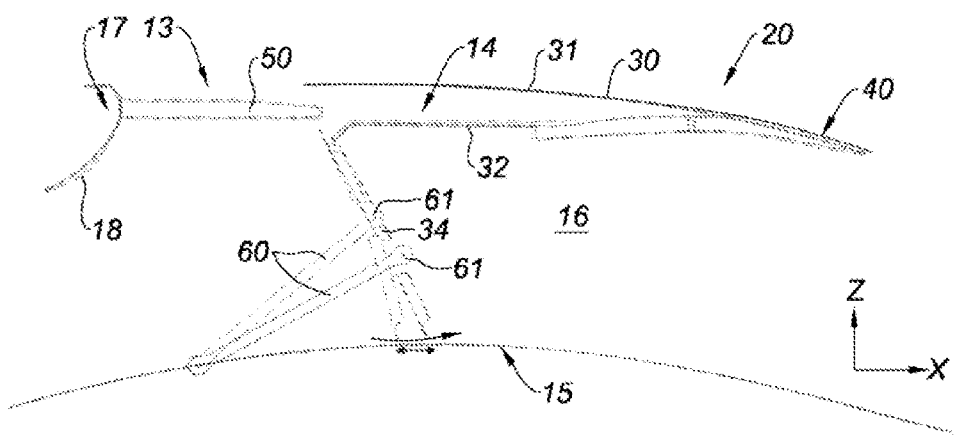

In reference more particularly to FIGS. 2 to 4, the downstream section 13 of the nacelle 10 comprises an outer structure 14 called OFS including the thrust reverser device 20, and an inner fairing structure 15 called IFS of the turbojet engine 2 defining, with the outer structure 14, a tunnel 16 designed for the circulation and discharge of the cold air flow.

The thrust reverser device 20 illustrated in these figures is a cascade reverser for deflecting the cold flow.

Thus, the space 20 comprises a moving cowl 30 mounted translatably, along a direction substantially parallel to a longitudinal axis X of the nacelle 10, relative to a stationary structure 17 of the nacelle 10 comprising at least one front frame 18.

This cowl 30 is also extended by at least one jet nozzle section 40 to channel the discharge of the cold air flow, mounted at a downstream end of said cowl 30.

More specifically, the cowl 30 comprises an outer shroud 31 and an inner shroud 32 that is in the continuation of the front frame 18 and is designed to delimit, in a direct jet position of the turbojet engine 2, an outer wall of the tunnel 16 in which the cold air flow flows.

The cowl 30 is capable of alternating between a closed position (illustrated in FIG. 3), in which it provides the aerodynamic continuity of the lines of the stationary structure 17 of the nacelle 10 and covers the cascade vanes 50, to an open position (illustrated in FIG. 4), downstream from the nacelle 10, in which it opens the passage in the nacelle 10 and exposes the cascade vanes 50.

In its open position illustrated in FIG. 4, the cowl 30 allows the cold air flow from the turbojet engine 2 to escape at least partially, said flow portion being reoriented toward the upstream direction of the nacelle, in particular by the exposed cascade vanes 50, thereby generating a counter-thrust capable of assisting with braking of the aircraft.

In one form of the thrust reverser device 20, in order to increase the cold air flow portion crossing through the cascade vanes 50, the inner shroud 32 of the cowl 30 can comprise multiple reverser flaps 34, distributed on its circumference.

Each reverser flap 34 is pivotably mounted by one end around a hinge pin, on the sliding cowl 30, between at least one retracted position (illustrated in FIG. 3), corresponding to a direct thrust operation of the turbojet engine 2, in which the flap 34 closes off the vane opening 50 and provides the inner aerodynamic continuity of the tunnel 16 with the front frame 18, and a deployed position (illustrated in FIG. 4) in which, in the thrust reversal situation, it partially closes off the tunnel 16 so as to deflect the flow of cold air toward the vanes 50.

In the context of the present disclosure, the length of the cascade vanes 50 is reduced and the dimensions of at least one reverser flap 34 are suitable for creating an air leak (designated by an arrow in FIG. 4) between that reverser flap 34 and the inner structure 15 of the nacelle 10, when the flaps 34 are in the deployed position.

During the direct thrust operation of the turbojet engine 2, the sliding cowl 30 forms all or part of a downstream part of the nacelle, the flaps 34 then being retracted in the sliding cowl 30.

To reverse the thrust of the turbojet engine 2, as illustrated in FIG. 4, the sliding cowl 30 is moved into the downstream position and the flaps 34 pivot into the deployed position so as to deflect the cold air flow toward the vanes 50 forming a reversed airflow guided by the vanes 50.

Furthermore, in reference more particularly to FIG. 2, the nacelle 10 is formed by two curved half-cowls 30, only one of which is shown in the figure, suitable for being connected to upper and/or lower beams (not illustrated) secured to the suspension pylon 3 of the aircraft propulsion assembly 1.

These upper and lower beams of the nacelle are situated vertically in the so-called 6 o'clock and 12 o'clock positions.

Advantageously, the exhaust tunnel for the cold air flow 16 is not of revolution around the longitudinal axis X.

More specifically, the transverse section, in the plane YZ, of the tunnel 16 is not constant over the periphery of the tunnel 16.

More specifically, its shape and dimensions are adapted so as to propose a transverse passage section for the cold air flow that is asymmetrical, the dimensions of which are larger in the horizontal direction Y and in the vertical direction Z of the tunnel 16.

The tunnel has a flat section on either side of the upper and/or lower beams connected to the pylon 3 so as to be compatible with the low ground clearance and the proximity of the wing 4.

The tunnel 16 then has a zone with a reduced transverse section on either side of the upper and/or lower beams connected to the pylon 3 over a limited angular distance, i.e., in the upper and/or lower part of the nacelle 10.

The height along Z of the tunnel 16 is thereby reduced its upper and/or lower tunnel parts 16.

To produce such a tunnel 16, the thrust reverser device has a vertically reduced bulk.

More particularly, the assembly of the two half-cowls 30 has an ellipsoid shape whereof the large axis is parallel to the axis Y and the small axis is parallel to the axis Z.

More specifically, the inner shroud 32 of each half-cowl 30 is not centered on a point O that coincides with the longitudinal axis X and is not circular in transverse section, while the inner structure 15 of the nacelle 10 is centered on said point O.

Thus, the radius R1 of the inner shroud 32 of each half-cowl 30, on either side of the upper and/or lower beams of the pylon 3, is smaller than the radius R2 of said shroud 32 along the axis Y.

The radii R1 and R2 are determined from the point O.

The height of the tunnel 16 is thereby reduced in the upper and/or lower part of the nacelle 10 defining, on those parts, a zone with a reduced transverse section of the tunnel 16 over the aforementioned angular distance.

As illustrated in FIG. 2, the deflecting flaps 34 are then radially offset relative to O, according to their position on the periphery of the tunnel 16 and the circumference of the nacelle 10.

The flaps 34 mounted in the zone of the tunnel 16 with a reduced transverse section are radially offset relative to the other flaps 34 mounted on the remaining periphery of the tunnel 16.

The system for driving the flaps 34 is described below relative to FIGS. 2 to 4.

Each flap 34 is supported by a pivot axis secured to the cowl 30 of the nacelle 10 and pivoted by at least one connecting rod 60 crossing through the tunnel 16.

Each driving connecting rod 60 is mounted rotatably around anchoring points on the corresponding flap 34 and on the inner structure 15 of the nacelle 10, respectively.

Thus, during movement of the cowl 30 in the upstream direction or downstream direction of the nacelle 10 driven by a suitable actuator, each connecting rod 60 pivots the corresponding flap 34.

It should be noted that, in the form illustrated in FIGS. 3 and 4, the pivoting of the flap 34 around its pivot point transverse to the longitudinal axis X of the nacelle is provided at its upstream end.

It is of course possible to articulate the flap 34 downstream from the tunnel 16, by its downstream end.

According to the present disclosure, the system for driving the flaps 34 comprises drive means suitable for selectively providing offset kinematics of the flaps 34 mounted on the zone of the tunnel 16 with a reduced transverse section relative to the kinetics of the flaps 34 mounted on the rest of the periphery of the tunnel 16.

In one form, the drive means are suitable for implementing offset pivoting of the flaps 34 mounted on the zone of the tunnel 16 with a reduced transverse section relative to the flaps 34 mounted on the rest of the periphery of the tunnel 16.

Such drive means deploy the flaps 34 mounted on the zone of the tunnel 16 with a reduced transverse section upstream or downstream from the other flaps 34, as described later relative to FIGS. 3 and 4.

In the second form, the drive means are suitable for implementing offset deployment of the flaps 34 mounted on the zone of the tunnel 16 with a reduced transverse section relative to the flaps 34 mounted on the rest of the periphery of the tunnel 16.

Such drive means delay or accelerate the deployment of the flaps 34 mounted on the zone of the tunnel 16 with a reduced transverse section relative to the other flaps 34.

This means that the movements of a flap 34 mounted on the zone of the tunnel 16 with a reduced transverse section and a flap mounted on the rest of the periphery of the tunnel 16 can be actuated slightly offset relative to one another.

According to one alternative of the first and second forms of such driving means, driving connecting rods 60 are provided with different lengths and/or anchoring points to a different station of the connecting rods 60 situated on the flaps 34 and/or the inner structure 15 of the nacelle 10.

In reference to FIGS. 3 and 4, the driving connecting rod 60 of each of the reverser flaps 34 over the entire periphery of the tunnel 16 have an identical length, which reduces maintenance errors and logistics costs.

In this alternative, the anchoring points of the connecting rod 60 heads 61 of the flaps 34 mounted on the zone of the tunnel 16 with a reduced transverse section, i.e., in the upper and/or lower part of the tunnel 16, are offset relative to those of the other reverser flaps 34.

More specifically, the anchoring points of the connecting rod 60 heads 61 of the flaps 34 mounted on the zone of the tunnel 16 with a reduced transverse cross-section are offset along the axis X and placed downstream from the anchoring points of the heads 61 of the connecting rods 60 for driving the other reverser flaps 34.

This offset can be seen in FIGS. 3 and 4, in which the flaps 34 mounted on the zone of the tunnel 16 with a reduced transverse section and their driving system are shown in solid lines, while the other flaps 34 and the corresponding driving system are shown in dotted lines.

Figure 5:
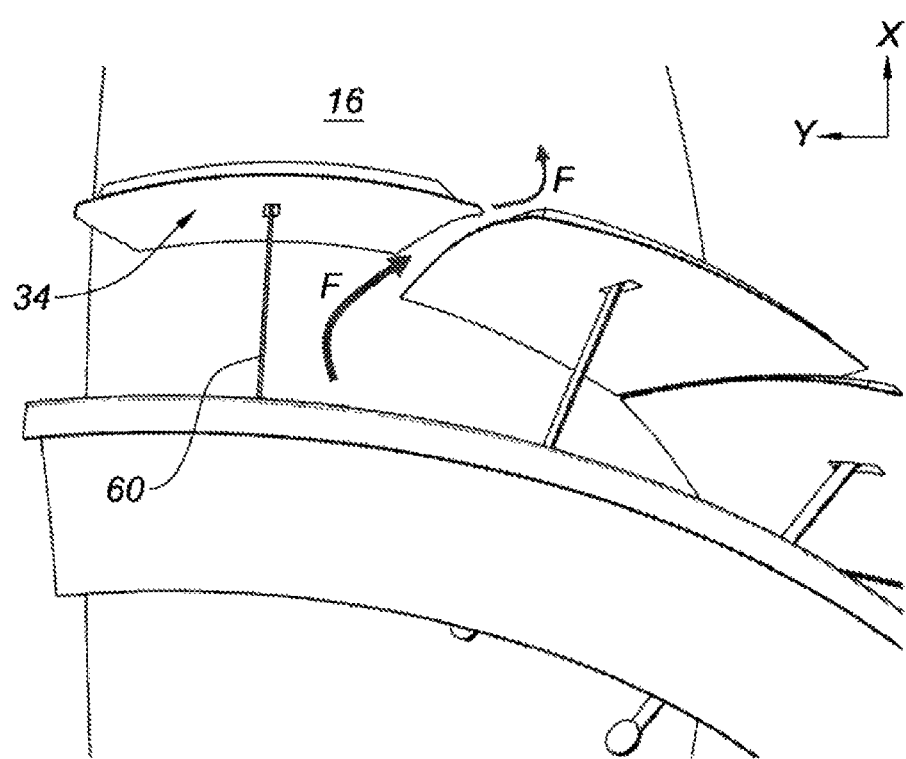
FIG. 5 is a top view of the thrust reverser device of FIG. 4.

In reference to FIGS. 4 and 5, during a thrust reversal phase of the turbojet engine 2, the sliding cowl 30 is moved toward the downstream direction of the nacelle 10, driving, through its sliding, the pivoting of the reverser flaps 34 in the tunnel 16.

At the end of their deployment, the flaps 34 mounted on the zone of the tunnel 16 with a reduced section are deployed downstream from the other reverser flaps 34, thereby creating a leak F of the cold air flow tangential to the flaps 34 mounted on the zone of the tunnel 16 with a reduced transverse section and the other adjacent flaps 34, said leak being designated by F and the corresponding arrows in FIG. 5.

This particular leak F thus produced on the most reduced transverse tunnel section 16 allows a flow of cold air to escape with an axial speed along X lower than that of a thrust reverser device of the prior art, in which the leak between the flaps was oriented axially along X.

The losses of reversal efficiency of the thrust reverser device are consequently reduced.

In fact, for a given reversal efficiency of the thrust reverser device, the leakage below the flaps 34 can thus be more significant, and therefore the length of the cascade vanes 50 can be reduced, making them easier to install in the thickness of the thrust reverser cowl and/or the middle section of the nacelle 10.

In fact, for a given flow rate through the reverser, the increase in the leakage air reduces the efficiency, since exiting air creates thrust in the axial direction.

If less thrust is created in the axial direction by tangential deflection of the leakage flow for the same flow rate, the efficiency is increased.

By choosing a given efficiency as the objective, it is therefore possible, still at total airflow rate iso in the reverser, to pass less air in the vanes and more air through the leakage section, therefore to reduce the length of the vanes (estimate of approximately 1 to 2%).

Furthermore, as illustrated in particular in FIG. 5, the articulations of the flaps 34 can be mounted in the thickness of aerodynamic lines of the cowl 30.

Of course, if the aerodynamic lines are not thick enough, it is possible to provide an overhang of said lines with an aerodynamic fairing association internally or externally, depending on the selected kinematics.

Furthermore, in FIG. 2, the nacelle 10 comprises five thrust reverser flaps 34 pivoting on each of the half-cowls 30.

Of course, the number of flaps depends on the geometry and size of the engine and is not limited to those illustrated.

Although the present disclosure has been described with specific example forms, it is of course in no way limited thereto and encompasses all technical equivalents of the described means as well as combinations thereof if they are within the context of the present disclosure.

It is thus for example possible to consider applying the present disclosure to a thrust reverser in which the thrust reverser cowl is formed in a single piece over the entire periphery of the reverser (so-called "O-duct" thrust reverser).

It is thus for example also possible to consider situating the anchoring points of the thrust reverser flaps of the zones of the cold air tunnel with a reduced section upstream from the anchoring points of the other flaps, which will position the 12 o'clock/6 o'clock flaps in front of the flaps of the current zone.

What is claimed is:

1. An aircraft propulsion assembly comprising at least a turbojet engine and a nacelle, said nacelle comprising:
    an outer structure provided with a thrust reverser device; and
    an inner structure covering a downstream section of the turbojet engine,
    the outer structure and the inner structure defining a flow tunnel for a flow of air from the turbojet engine,
    wherein the thrust reverser device comprises:
        means for deflecting at least part of the flow of air from the turbojet engine;
        at least one moving cowl translatable in a direction parallel to a longitudinal axis of the nacelle, the moving cowl being able to alternate between a closed position, in which it provides an aerodynamic continuity of the nacelle, and an open position, in which it opens a passage in the nacelle for the deflected air flow; and
        flaps mounted pivoting between a retracted position, in which they provide an aerodynamic continuity of the nacelle, and a deployed position in which, in the thrust reversal situation, they partially close off the flow tunnel so as to deflect the flow of air toward the deflection means exposed by the sliding of the moving cowl, each flap being associated with a drive system,
    wherein the flow tunnel has a varied transverse section over a periphery of the nacelle, such that at least one flap is radially offset with respect to a central axis of the turbojet engine, relative to the adjacent flaps,
    wherein the drive system for driving the at least one radially offset flap provides offset kinematics of the at least one radially offset flap mounted within a reduced cross-section of the varied transverse section of the flow tunnel relative to kinematics of the flaps mounted outside the varied transverse section of the flow tunnel such that a leak flow is created within the reduced cross-section of the flow tunnel in the deployed position.

2. The assembly according to claim 1, wherein the flow tunnel has a zone with a reduced transverse section on either side of upper and/or lower beams connected to a suspension pylon of the aircraft propulsion assembly.

3. The assembly according to claim 2, wherein a radius (R1) of an inner shroud of the moving cowl, on either side of the upper and/or lower beams, is smaller than a radius (R2) of said inner shroud along a horizontal axis, perpendicular to the central axis of the turbojet engine (X).

4. The assembly according to claim 2, wherein the drive system is suitable for implementing offset pivoting of the flaps mounted on the zone with a reduced transverse section of the flow tunnel relative to the flaps mounted on the rest of the periphery of the flow tunnel.

5. The assembly according to claim 4, wherein the drive system deploys the flaps mounted on the zone of the flow tunnel with a reduced transverse section upstream or downstream from the other flaps mounted on the rest of the periphery of the flow tunnel.

6. The assembly according to claim 2, wherein the drive system limits an offset deployment of the flaps mounted on the zone of the flow tunnel with a reduced transverse cross-section relative to the flaps mounted on the rest of the periphery of the flow tunnel.

7. The assembly according to claim 2, wherein the drive system comprises a connecting rod for each of the flaps, said connecting rods having an identical length and having anchoring points situated on the flaps mounted within the zone of the flow tunnel with a reduced transverse cross-section, said anchoring points being offset along the central axis and placed downstream from the anchoring points of the connecting rods situated on the flaps mounted outside the varied transverse section of the flow tunnel.

8. The assembly according to claim 2, wherein the drive system comprises a connecting rod for each of the flaps, said connecting rods having an identical length and anchoring points of the connecting rods, situated on the inner structure of the nacelle, of the flaps mounted within the zone of the flow tunnel with a reduced transverse cross-section being offset relative to those of the flaps mounted on the rest of the periphery of the flow tunnel.

* * * * *